US009162848B2

(12) United States Patent
Ascua et al.

(10) Patent No.: US 9,162,848 B2
(45) Date of Patent: Oct. 20, 2015

(54) VACUUM BRAKE

(71) Applicants: Carlos M. Ascua, Parana (AR); Juan Carlos De Ledebur, Medley, FL (US)

(72) Inventors: Carlos M. Ascua, Parana (AR); Juan Carlos De Ledebur, Medley, FL (US)

( * ) Notice: Subject to any disclaimer, the term of this patent is extended or adjusted under 35 U.S.C. 154(b) by 288 days.

(21) Appl. No.: 13/762,477

(22) Filed: Feb. 8, 2013

(65) Prior Publication Data

US 2014/0224593 A1 Aug. 14, 2014

(51) Int. Cl.

| | |
|---|---|
| ***B66B 9/02*** | (2006.01) |
| ***B65G 51/06*** | (2006.01) |
| ***B66B 5/18*** | (2006.01) |
| ***B66B 9/04*** | (2006.01) |

(52) U.S. Cl.

CPC .... *B66B 5/18* (2013.01); *B66B 9/04* (2013.01)

(58) Field of Classification Search

CPC .............. B66B 5/04; B66B 5/16; B66B 5/18; B66B 5/22; B66B 5/044; B66B 9/00; B66B 9/04

USPC .............. 187/250; 406/83, 84, 187, 188, 189, 406/190

See application file for complete search history.

(56) References Cited

U.S. PATENT DOCUMENTS

| | | | | | |
|---|---|---|---|---|---|
| 797,044 | A * | 8/1905 | Burl | .............................. | 406/186 |
| 1,578,723 | A * | 3/1926 | Fellows | ........................ | 406/190 |
| 1,707,099 | A * | 3/1929 | Stein et al. | .................... | 187/372 |
| 1,867,991 | A * | 7/1932 | Shinn | ............................ | 187/367 |
| 1,934,508 | A * | 11/1933 | McCormick | .................. | 187/375 |
| 3,580,527 | A * | 5/1971 | Cynober | .......................... | 406/84 |
| 3,593,948 | A * | 7/1971 | McClellan | .................... | 406/186 |
| 3,762,512 | A * | 10/1973 | McIntyre | ...................... | 188/189 |
| 3,949,953 | A * | 4/1976 | Hopkins | ....................... | 406/185 |
| 4,029,177 | A * | 6/1977 | Fiss | ............................... | 187/374 |
| 5,096,020 | A * | 3/1992 | Korhonen | ..................... | 187/376 |
| 5,230,406 | A * | 7/1993 | Poon | ............................. | 187/376 |
| 5,363,942 | A * | 11/1994 | Osada | ........................... | 187/376 |
| 5,447,211 | A * | 9/1995 | Sors | .............................. | 187/277 |
| 5,583,326 | A * | 12/1996 | Sors | .............................. | 187/277 |
| 6,085,873 | A * | 7/2000 | Macchi | ......................... | 187/273 |
| 6,425,462 | B1 * | 7/2002 | Tran et al. | ..................... | 187/367 |
| 7,131,517 | B1 * | 11/2006 | de Asis Mateo Mur | ...... | 187/370 |
| 2005/0241886 | A1 * | 11/2005 | Marti et al. | .................. | 187/351 |

* cited by examiner

*Primary Examiner* — William E Dondero
*Assistant Examiner* — Minh Truong
(74) *Attorney, Agent, or Firm* — Patent CEO, LLC; Phillip F. Vales

(57) ABSTRACT

A set of four brake assemblies are arranged to grasp a guide railing in a pneumatic vacuum elevator cylinder. The brake assemblies are each attached to a seal of the cabin or vehicular compartment traveling within the cylinder and to a structural support member within the vehicle. Additionally, each set has a pair of brakes utilizing a spring actuated shaft indirectly connected to the cabin seal through a lever attached to the brake back plate. This lever acts on a rod device directly connected to the cabin seal in order to take advantage of a pressure differential for the opening and closing of the individual brakes.

6 Claims, 13 Drawing Sheets

100

100

200

300

400

500

620
625

665
660
655

600
610
615

605

630
635
640

645
650

705

720

710
715

725
730
735

740
745
750
755

700

Replacement Sheet
805
810
820
825
827
815

805
803
801

830
835
840
842
845
850

830
833
831

860
865

870
855
861

880

890
895
876

885
875
899

800

945
950
955

940

980

925
930

920
935

975

900

915
970
907
910

907
905

965
960

1000

Atmospheric (high) pressure
Car Seal 1125
1115
1110
1110
Rail 1120
1105

Rail 1120

1100
Low Pressure/ Vacuum
Car Seal 1125
1115
1110
1110
Rail 1120
1105

Rail 1120

1200

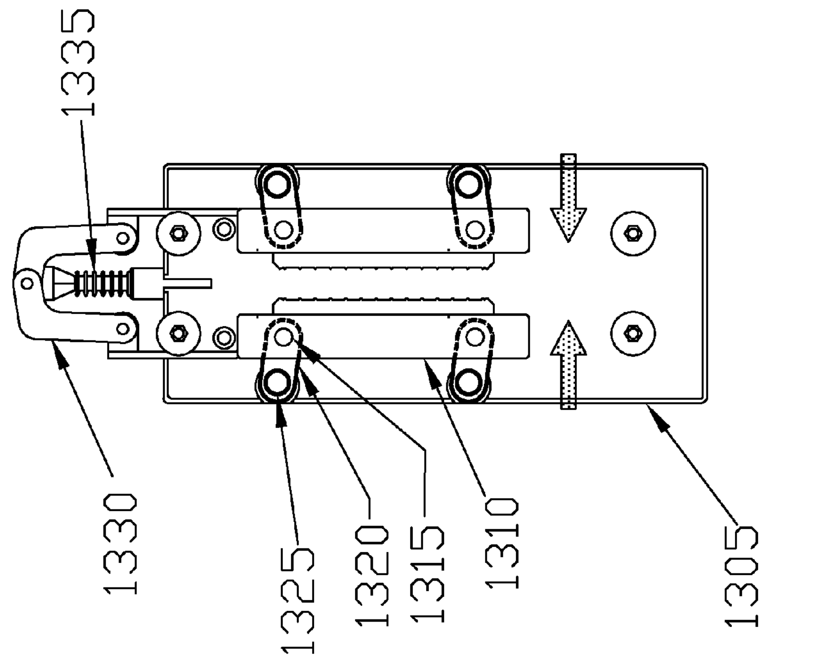
Figure 13b
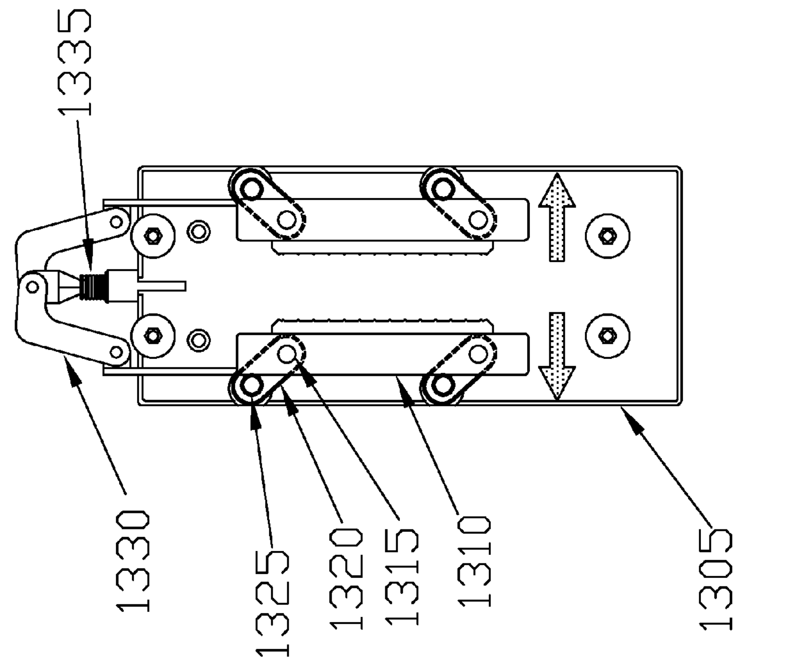
Figure 13a
Figure 13
1300

VACUUM BRAKE

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the United States Patent and Trademark Office patent file or records, but otherwise reserves all copyrights whatsoever.

BACKGROUND (1) Field of the Invention

Relating to improvements in controls utilized to move a pneumatic type elevator. More specifically, relating to improvements in a vacuum brake controlling the movement of a pneumatic elevator cabin inside of its cylinder.

When there is a loss of differential pressure it is very important to be able to brake a pneumatic elevator so as to ensure the safety of any occupants and of the cabin itself. Current technologies employ a set of teeth or brail-like protrusions on the surface of the brake; these are specifically designed to retard the descent of the cabin or vehicle as needed. Even though there are other brakes in the market all of these require electrical power, a slot to anchor the brake to, a tensioned cable from the controls, and or an electrical sensor to activate. Thus, it would be advantageous to make a brake that does not suffer from any of the aforementioned deficiencies.

BRIEF SUMMARY OF THE INVENTION

A safety brake for an enclosed pneumatic elevator cabin having a seal and riding within a cylinder comprising:

a rod device connected to a seal of the cabin and further connected to a braking device connected to the cabin.

In another aspect, a cylindrical compression spring loaded onto the brake pad rod until it meets a head piece of the brake pad rod that is larger than the diameter of the compression spring.

In another aspect, a brake pad rod guide attached to the braking device and the brake pad rod guide having a cavity therein such that the brake pad rod is inserted in the brake pad rod guide under the spring.

In another aspect, wherein the brake pad rod connected to the rod device and the braking device further comprises:

a brake pivot lever attached to the brake pad rod, to the rod device and to the braking device.

In another aspect, a pair of brake levers attached to the head piece of the brake pad rod.

In another aspect, wherein each of the pair of brake levers is attached at and end thereof to the head piece.

In another aspect, a pair of brake holders moveably mounted on the braking device and attached to the brake levers such that each brake holder is attached to just one of the levers.

In another aspect, a pair of brake pads each attached to just one of the brake holders.

In another aspect, wherein the pair of brake holders moveably mounted on the braking device are attached to swivel mounts moveably attached to the braking device.

A safety brake apparatus comprising:

a safety brake back plate attached to a pneumatic vacuum vehicular seal through a connection device a pair of brake pads where each one is solely attached to one of a pair of brake holders attached to the brake back plate such that the pair of brake holders are attached to the connection device.

In another aspect a pair of brake bumpers attached to the safety brake back plate.

In another aspect, a guide device attached to the safety brake back plate.

In another aspect, a pair of guide wheels moveably attached to the safety brake back plate.

In another aspect, wherein the connection device actuates a spring device attached thereto.

A pneumatic vacuum elevator comprising:

a braking device connected to a structural element of the pneumatic vacuum elevator wherein the braking device is further connected to a seal of the pneumatic vacuum elevator through an intermediate device that comprises:

a spring actuated assembly that comprises:

a pair of brake holders moveably attached to the brake device each having a brake pad and each brake holder attached to one of a pair of levers wherein the pair of levers are connected to each other at a point and at that same point with a shaft having a threaded end and a headpiece at another end such that a spring is loaded on the shaft such that a shaft holder having the shaft inserted therein with the spring between the shaft holder and the head piece of the shaft where the shaft holder is connected to the brake device wherein the shaft is connected at a threaded end to a lever that is itself connected to a rod device that is connected to the seal.

BRIEF DESCRIPTION OF THE SEVERAL VIEWS OF THE DRAWINGS

FIG. 9 illustrates various components of the brake pad device. FIG. 9*a* shows a front view of a bottom pad holder whilst FIG. 9*f* shows a top view and FIG. 9*g* shows a side view thereof; FIG. 9*b* shows a front view of a left pad lever whilst FIG. 9*h* shows a top view and FIG. 9*i* shows a side view thereof; whilst FIG. 9*j* shows a top view and FIG. 9*k* shows a side view thereof; FIG. 9*d* shows a front view of a top pad holder whilst FIG. 91 shows a top view and FIG. 9*m* shows a side view thereof; and FIG. 9*e* shows a front view of a pad whilst FIG. 9*n* shows a top view thereof and FIG. 9*o* shows a side view thereof.

FIG. 10*a* shows a front view whilst FIG. 10*c* shows a rear view of the effect of low pressure on the brake device; FIG. 10*b* shows a front view whilst FIG. 10*d* shows a rear view of the effect of high pressure on the brake device.

FIG. 13 illustrates in more detail the motion of the braking system that causes the opening and closing of the brake; in particular, FIG. 13*a* illustrates the opening of the brakes and FIG. 13*b* shows the closing of the brakes.

DETAILED DESCRIPTION OF THE INVENTION

Figure 1:
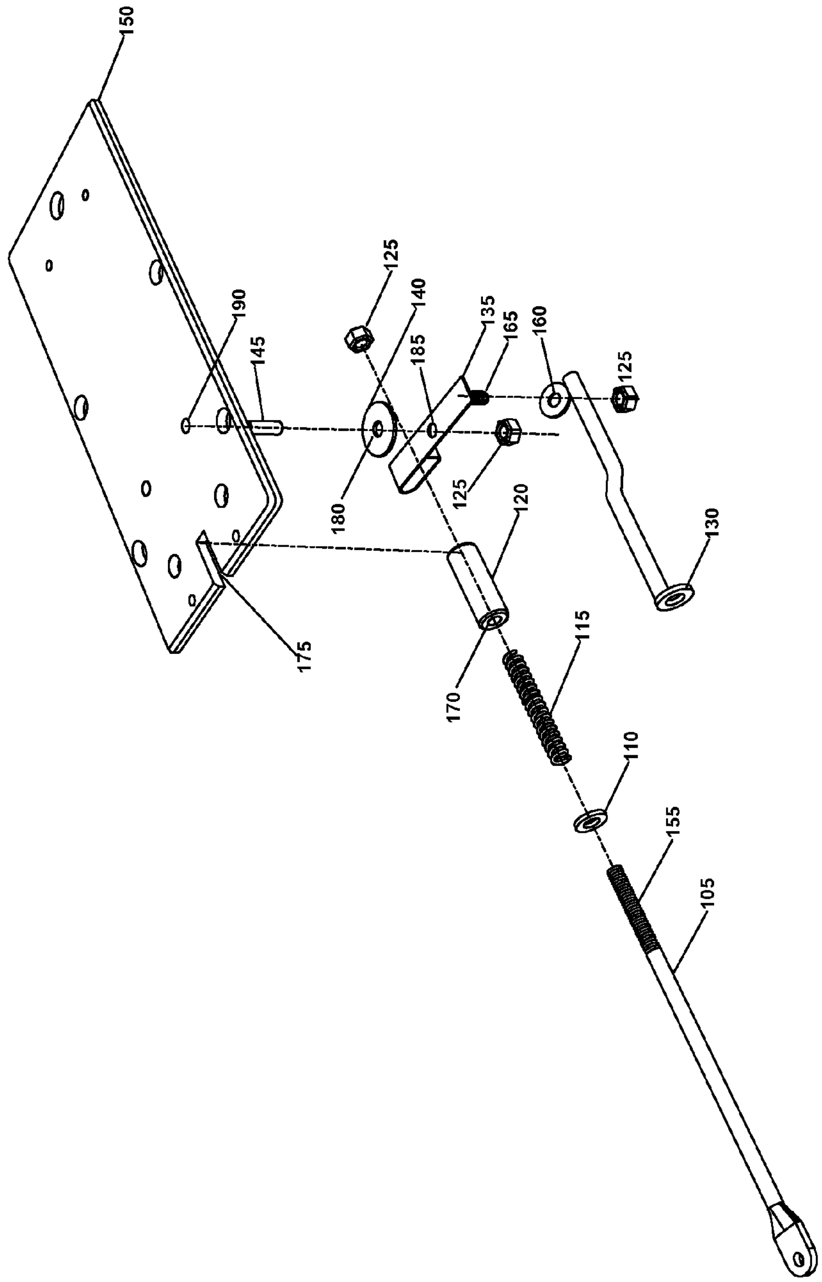
FIG. 1 illustrates brake back plate having various components attached thereto.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The differential vacuum brake disclosed herein works mechanically in conjunction with the upper portion of the transport cabin or vehicle. The brake is free to open when differential pressure is present created through a device attached to the cabin. As the differential pressure is removed the brake will close biting on the column guide attached to the cylinder guideway. Due to the mechanical design no electrical power is required to brake the transport cabin or vehicle. Similarly, a sudden loss of power would not cause the cabin or vehicle to break or stop between floors thereby reducing system malfunctions that occur in other systems. One implementation of a pneumatic vacuum elevator has a 'Differential Pressure Safety Brakes' that is used as an intermediate breaking device in addition to a locking/stopping device that is used at the landings. The intermediate braking device of this embodiment has four brakes and each travels along a column guide which is integral with the elevator cylinder guideway within which the elevator cabin moves. As previously stated, when an air suction device at top of elevator creates a pressure differential the 'Differential Pressure Safety Brakes' are released; this release is caused by an initial vertically allowed movement of the upper part of the transport cab or vehicle that actuates the brake mechanism to an open position; as long as the pressure differential is maintained the brakes remain open. However, once the pressure differential is no longer present the displacement of the upper part of the transport cabin or vehicle is immediately returned to its original position by the action of the spring mounted on the brake. The removal of the pressure differential of the upper part of the transport cabin or vehicle causes the 'Differential Pressure Safety Brake' to close on a column guide using the teeth or brail-like surface on them allowing them to bite into the column guide and thereby stopping the motion of the transport cabin or vehicle. The teeth or brail-like surface of the brake pads are positioned and designed in such a way that they only stop the cabin or vehicle as they move in a downwards direction. The teeth or brail-like surfaces of the pads are positioned and designed in such a way that the column guide can not be damaged. This design is such that the unit can quickly be placed back in operation once the differential pressure is regained. Further, these brakes have the ability of braking the cabin in the event of a sudden lost of vacuum or any other incident that could lead to an uncontrollable descent of the elevator cabin in its cylindrical guideway. Finally, it should be apparent from the above discussion that the brakes are normally in a closed position, therefore, if they are released mechanically by switching to an open mode, this permits the elevator to travel upward or down.

FIG. 1 illustrates a view 100 of brake back plate 150 having various components attached thereto that are to be attached to the bottom of the brake back plate 150 in the drawing. In particular, the main components to be discussed are how the brake pad rod 105 and the brake seal rod 130 are connected to the brake back plate 150. The brake pad rod 105 has a flat end with a hole and a threaded end 155. This threaded end 155 passes through a washer 110 and further on through a compression spring 115. The threaded end 155 of the brake pad rod 105 further passes through a brake pad rod guide 120 that has a cavity from one end to another side of the brake pad rod guide; the brake pad rod guide 120 has a cavity of a diameter smaller than that of the spring compression 115 so that the material at the either end of the brake pad rod guide 120 forms an annulus with a cavity 170; thus, the compression spring 115 can not proceed further then this brake pad rod guide to the upper right in the drawing as it sits atop this annulus material about the cavity, nor can it proceed down the opposite direction as the head of the brake pad rod 105 is larger than the diameter of the spring. The brake pad rod 105 further next passes through a cavity in one side of pivot lever 135; once through this opening the threaded end of the brake pad rod 105 is locked by a hex nylon locking nut 125. This locking nut 125 is larger than the cavity in the brake pivot lever 135. The brake pad rod guide 120 is welded into a rectangular notch or cutout 175 in the front transverse edge of brake back plate 150. Brake pivot lever 135 has a central hole 185 that permits passage of a threaded hex bolt 145 therethrough that has its head welded to a perforation 190 (located between the holes for the pad swivel arm mount) in the brake back plate 150; the threaded hex bolt 145 passes through a washer 180 then on through central hole 185 that is larger than its diameter such that the brake pivot lever 135 can swivel about the hex bolt 145 and it is then locked by a hex nylon locking nut 125 on the other side of the brake pivot lever 135 such that the bolt 145 can thereon not disengage from this brake pivot lever 135. Finally, the head of threaded hex bolt 165 is welded to the underside of brake pivot lever 135 such that it proceeds through an annulus 160 or disk shaped flange that is situated at one end of brake seal rod 130 and locked with nut 125. This annulus 160 is situated such that it runs along the longitudinal end of the brake seal rod 130 that is itself shaped in a crankshaft type of configuration having a portion of the rod offset from the other part of the rod.

Figure 2:
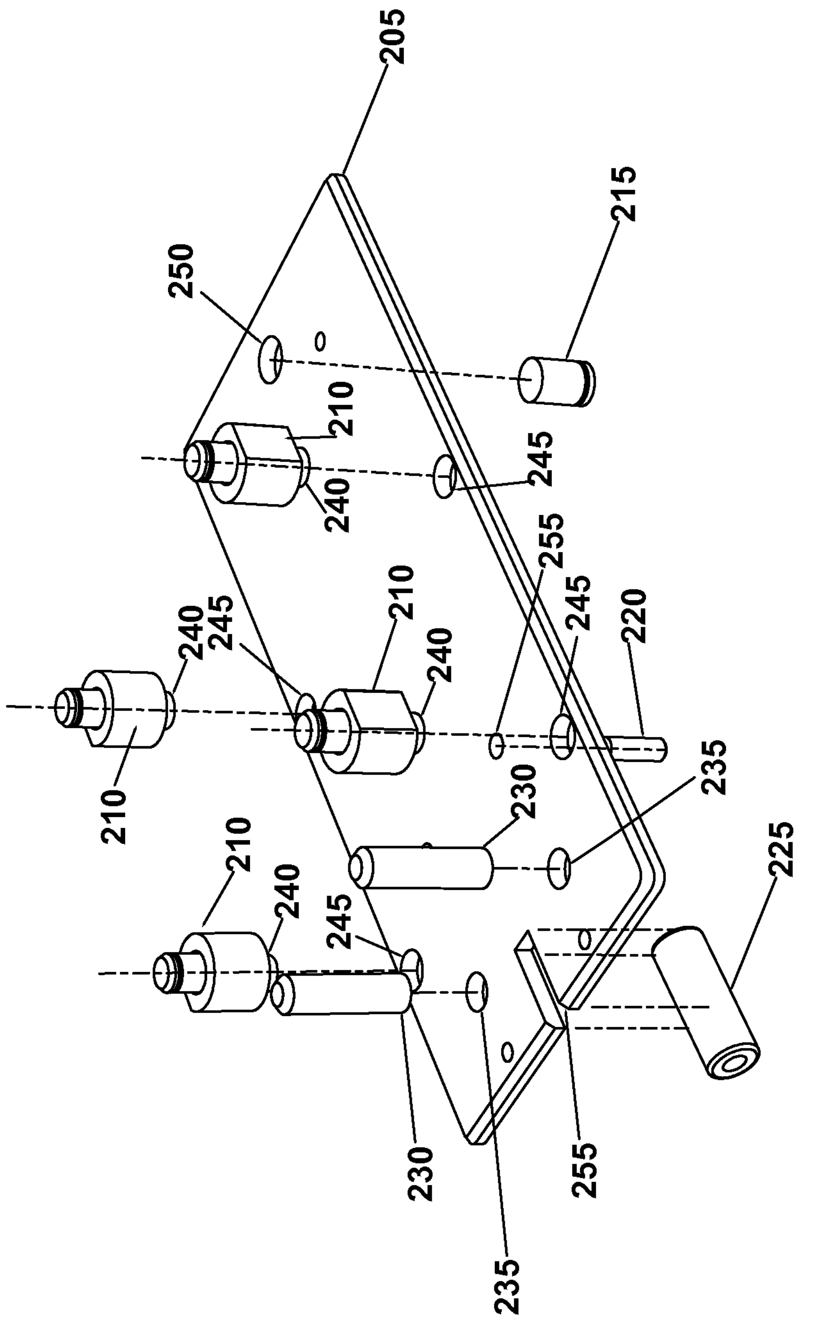
FIG. 2 illustrates several components that are attached to the top of brake back plate and a few that are attached to its bottom as viewed in the drawing.
Figures 12, 12A, 12B:
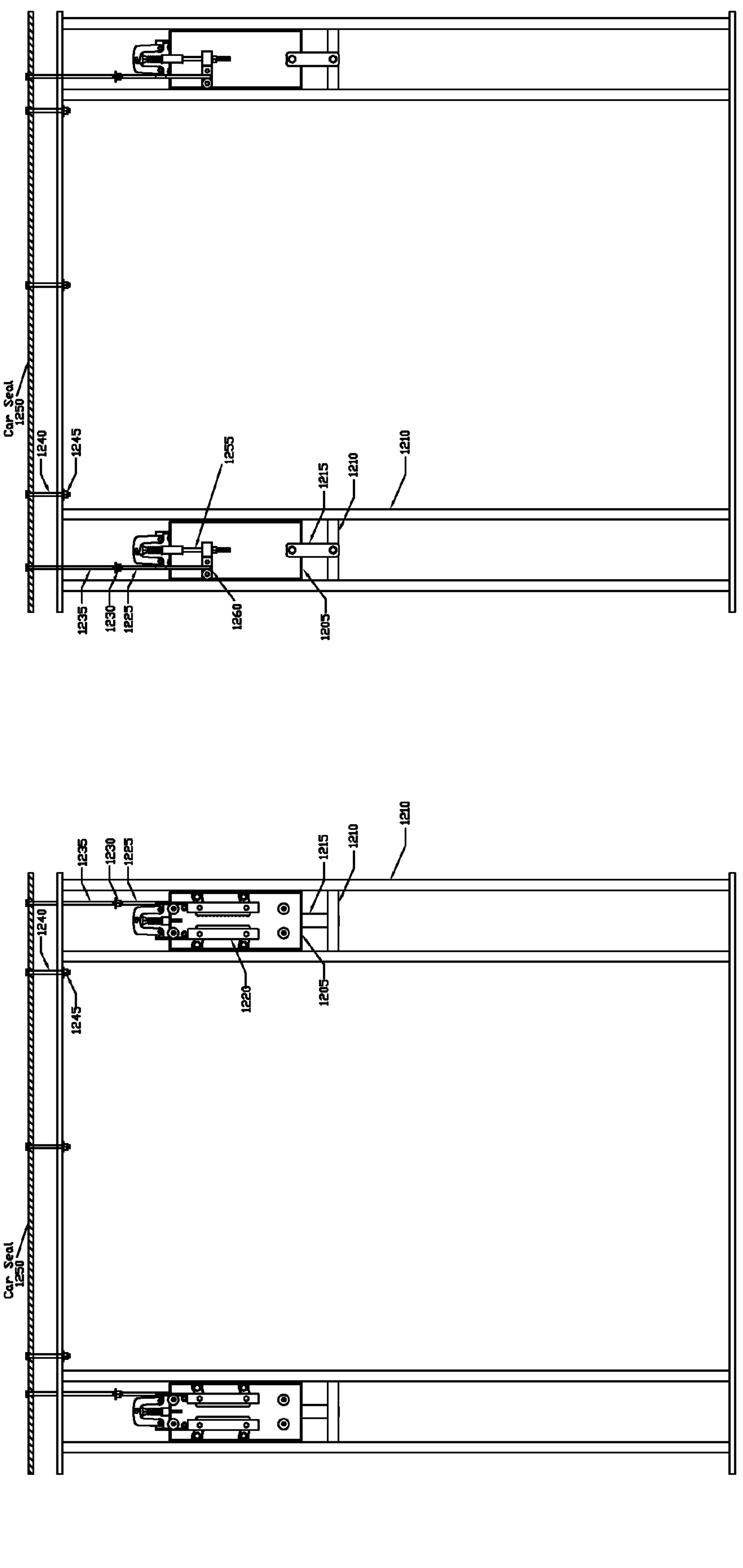
FIG. 12 illustrates the location of two brakes on either side of the cabin; in particular
FIG. 12*a* illustrates a front view of the installation of brakes whilst
FIG. 12*b* illustrates a back view of the installation of brakes on either side of the cabin structure.

FIG. 2 illustrates a view 200 of several components that are attached to the top of brake back plate and a few that are attached to its bottom. Brake Pad Rod Guide 225 is again shown welded to a notch 255 on the left transverse end of the brake back plate; this guide 225 is welded underneath the backplate and a portion of the way through the notch 255. Stoppers 230 are circular metal pieces that are welded to two holes 235 on the top of the brake back plate 205 such that the holes 235 are equidistant from the central notch 255 and closer to the notch than a first couple of holes 245 that are formed in the top of the brake back plate 205. These holes 245 are located nearer the longitudinal edge of brake back plate 205 then the other holes therein and are for the welding of the bottom 240 of pad swivel arm mount 210; the pad swivel arm mount 210 have a bottom circular portion 240 that is smaller in diameter than that of the middle portion of the pad swivel arm mount 210. A hole 255 is positioned upwards in the drawing or further away from the notch but closer to the first right hole 245 than the first left one 245 and is utilized for the welding of the top of a hex bolt that is to be attached through a hole in a lever (not shown). A second set of holes 245 are located near the edge of brake back plate 205 as were the first couple of holes 245 therein and are for the welding of the bottom 240 of two other pad swivel arm mounts 210; the pad swivel arm mounts 210 have a bottom circular portion 240 that is smaller in diameter than that of the middle portion of the pad swivel arm mounts 210. A brake support lever mount is a circular piece of material having a circumferential depression at one end and an ordinary circular surface at the other end; this mount 215 is welded at the bottom side of brake back plate 205 on its ordinary circular end using a hole 250 that is at the midpoint in the upper right of the drawing; this brake support lever mount 215 is attached to the car as shown in FIG. 12.

Figure 3:
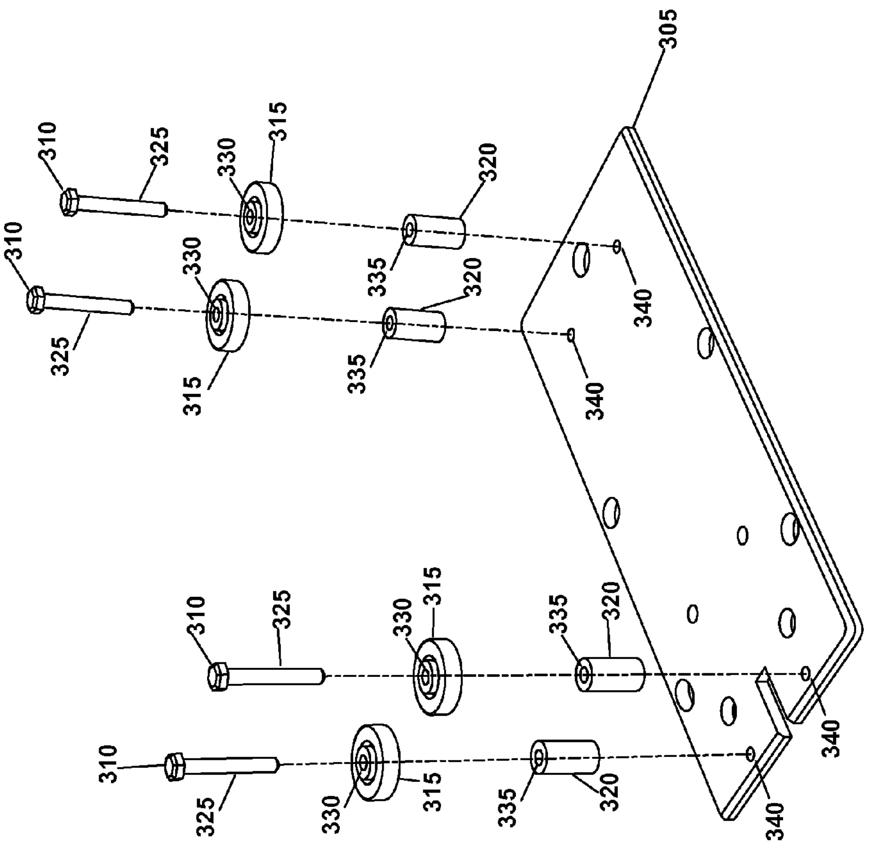
FIG. 3 illustrates a view of a track positioning system designed to keep the overall brake aligned to a brake track or rail.

FIG. 3 illustrates a view 300 of a track positioning system designed to keep the overall brake aligned to a brake track or rail. The rollers discussed below are situated on either side of a track or rail shown more clearly in FIG. 11 and other figures. Four holes 340 are arranged about the top of brake plate 305 for the insertion of hex bolts 325 having heads 310. The bolts 325 pass through central perforations or holes 330 in wheel rollers 315 and further on through central perforations or holes 335 in cylindrical wheel spacers 320. The bolts 325 are screwed on to the brake back plate 305 at the end opposite the head. The first set of two threaded holes 340 are situated at the left of the drawing on either side of the notch and are the closest holes to the left transverse edges on either side of the notch in the brake back plate 305; further, they are equidistant from either side of the notch and are the closest set of holes to the notch than any of the other holes or perforations on the brake back plate 305. The same general layout is for the other set of threaded holes 340 located on the right side of the brake back plate 305; however, their are some differences in their positioning in that these holes or perforations are not as close to the opposite transverse right edge as were the left threaded holes 340 to their transverse edge and are situated before the hole for the brake anchor.

Figure 4:
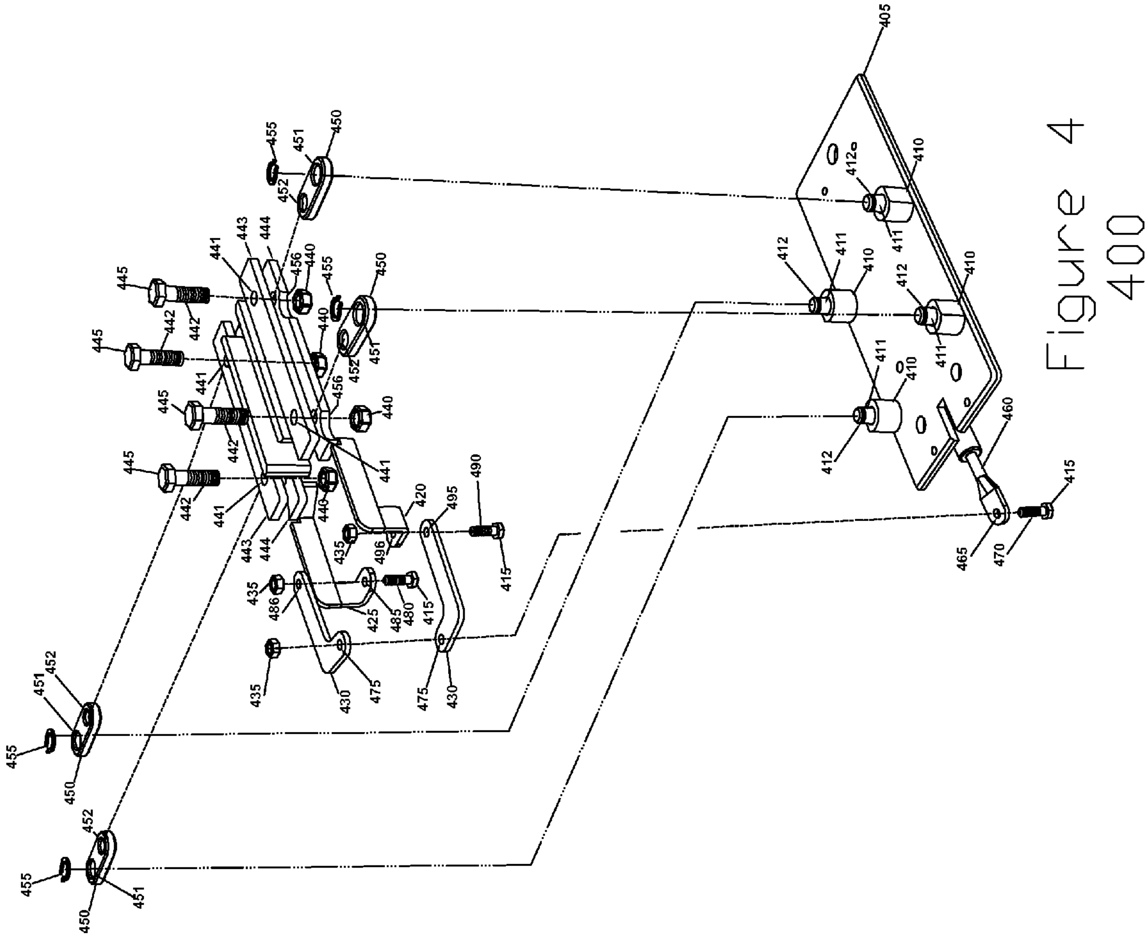
FIG. 4 illustrates a view of the brake back plate as well as several components to more clearly describe their positioning.

FIG. 4 illustrates a view of the brake back plate as well as several components to more clearly describe their positioning. Brake back plate 405 has four brake support lever mounts 410 (pad swivel arm mount) welded in a substantially square configuration. The top of each of the brake support lever mounts 410 has a narrow circular portion 411 that has a depression 412 running along its external circumference for insertion of a ‘C’ clip 455; the ‘C’ clip is inserted therein so that a swivel arm 450 connected as follows can not disengage from the top portion 411 of the support lever mounts 410. The brake support lever mount 410 has a smaller diameter end 411 that passes through the swivel arm 450 using its hole 451 whereby it can perform a swiveling motion to actuate the breaking action. Then they are locked in place by the aforementioned ‘C’ clip 455 in the depression 412 at the top portion of the brake support level mount 410. The other portion of each of the swivel arms 450 has another hole 452 on the opposite side of the first hole 451 for connection to one of four threaded 442 hex bolts 445 and locking nuts 440. Two of these hex bolts 445 are placed through two holes on the right pad holder and two placed in the left pad holder. Each of the brake holders, right and left, are made from a top and bottom longitudinal rectangular pad holding members 443 and 444 that are welded to one of two pad levers 420, 425. Thus, an individual brake holder is made from a set of two pad holders 443, 444, that is further welded to a longitudinally extended pad lever 420, 425. The member 443 on each side each has two holes 441 for insertion therethrough of hex bolts 445 then through a hole 452 in a swivel arm 450; the member 444 on each side has two holes 441 for the insertion of hex bolts 445 already through the first member 443 then through the holes 456 in the other member 444 and engagement of the nuts 440 for the connection of the brake pad holders 443, 444 to the swivel arm 450. It should be understood that this connection is of such a character that it permits a swiveling action on both pivots, the brake support lever mount 410 and the hex bolts 445 for each of the swivel mounts thereby facilitating the brake locking action as described further below. Further, the pad holders 443, 444 are connected on either the right or left brake holder to a welded pad lever 420, 425 having a hole 496, 485 therein for insertion of a threaded 490, 480 hex bolt 415 for each brake pad lever 420, 425; first, the threaded end 490 of one of the bolts 415 is placed through a hole 495 in the longer portion of the bottom of an 'L' shaped lever 430 through a hole 496 in the front portion of welded pad lever 420 of the right brake pad and through hex bolt 435 that attaches it together. It should be understood for this connection as for the following connections that it is made such that a twisting motion is permitted at the bolt location, thus, it is NOT fixedly locked in place. Then, the threaded end 480 of another one of the bolts 415 is placed through a hole 485 in the front portion of welded pad lever 425 then through a hole 486 in the longer portion of the bottom of the other 'L' shaped lever 430 of the left brake pad and through hex bolt 435 that attaches it together. Finally, the front portions of 'L' shape levers 430 are attached together and to the brake pad rod 460 as follows. A threaded 470 hex bolt 415 is placed through the underside of a hole 465 in the head piece of brake pad rod 460 and then through a hole 475 in the shorter portion of right 'L' shaped lever 430 and then through a similar hole 475 in the shorter portion of left 'L' shaped lever 430 thereby attaching the brake pad rod 460 to the front short portions of both 'L' shaped levers that are thereby also attached together using a locking nut 435.

Figures 5, 5A, 5B, 5C:
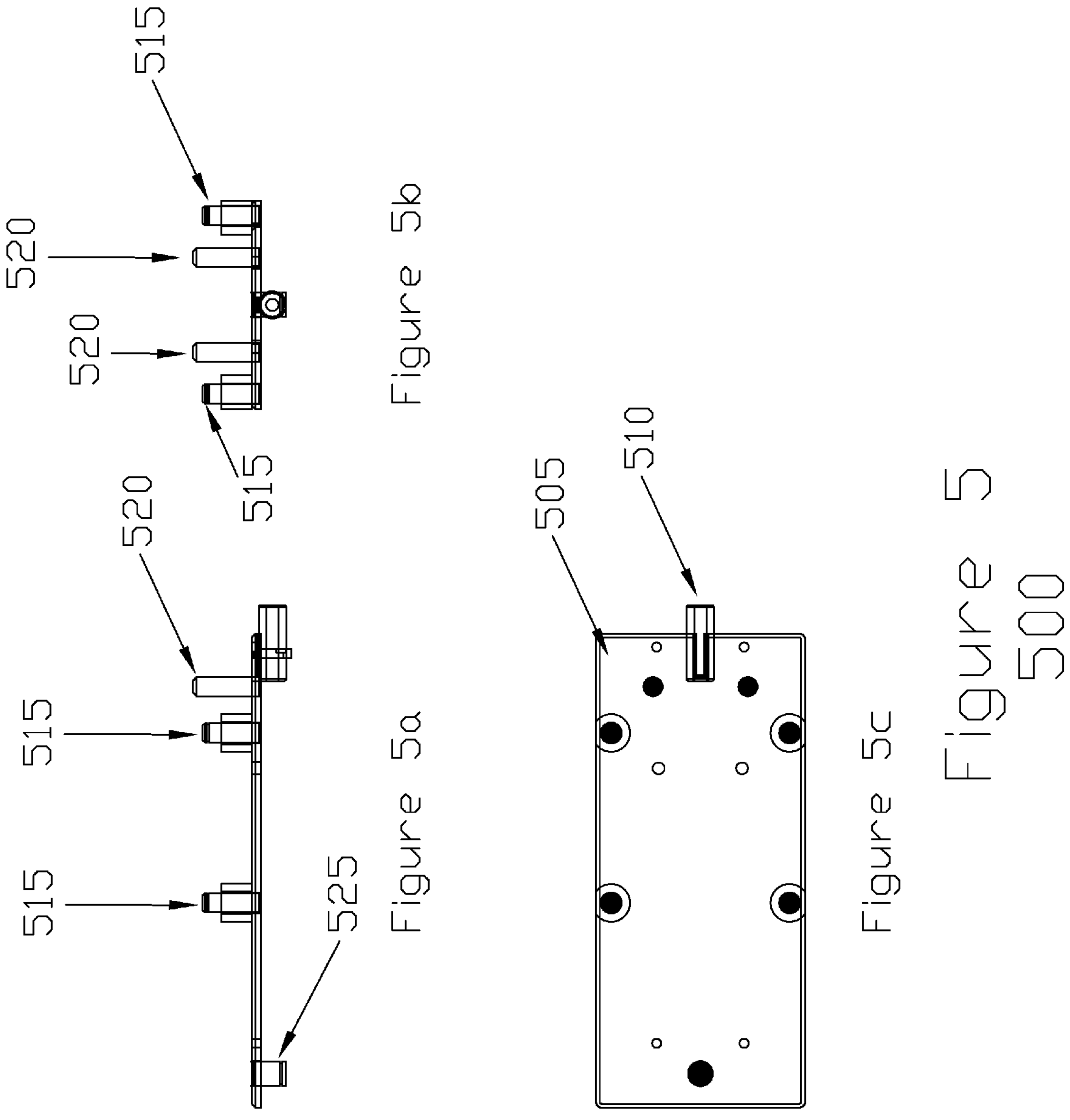
FIG. 5 illustrates several views of the brake back plate as well as several components to more clearly describe their positioning. In particular, there is a side view at the upper left FIG. 5A, a top view FIG. 5C at the bottom left and a back view FIG. 5B at the upper right of the brake back plate as well as several components to more clearly describe their positioning.

FIG. 5 illustrates several views 500 of the brake back plate as well as several components to more clearly describe their positioning. For the purposes of discussing this figure the views are described as a side view at the upper left, a top view at the bottom left and a back view at the upper right. In the side view starting at the left in the drawing, first is shown the arrangement of the brake support lever mount 525 underneath the brake plate 505 followed by the first set of brake support lever mount 515 on top that is followed by the second set of brake support lever mounts 515 also on top. These are followed by the level bumpers 520 on top and the brake pad rod guide 510 located underneath in this view. In the top view starting at the left in the drawing, first comes a centrally located brake support lever mount 525 then the first of a set of brake support lever mounts 515 situated near the longitudinal edges of the brake back plate 505 approximately half way across the brake plate. Then comes the second set of brake support lever mount 515 situated near the longitudinal edges of the brake back plate 505 approximately three fourths of the way across the brake plate 505. Further on in the drawing one finds the level bumpers 520 that are situated equidistantly from either side of the brake pad rod guide 510 that is itself located in a central notch on the right transverse side of the brake back plate 505; the level bumpers 520 are also situated such that they are further along longitudinally then the second set of brake support lever mounts 515 but a portion of their body bleeds into a beginning portion of the brake pad rod guide 510. In the upper right is shown a back view of the brake back plate 505 and several attached components. From left to right, this back view shows that first comes the first brake support lever mount 515 that are followed by the lever bumpers 520 equidistantly spaced on either side from the bottom centrally located brake pad rod guide 510 followed by the second brake support lever mount 515.

Figures 6, 6A, 6B, 6C, 6D, 6E, 6F, 6G, 6H, 6I:
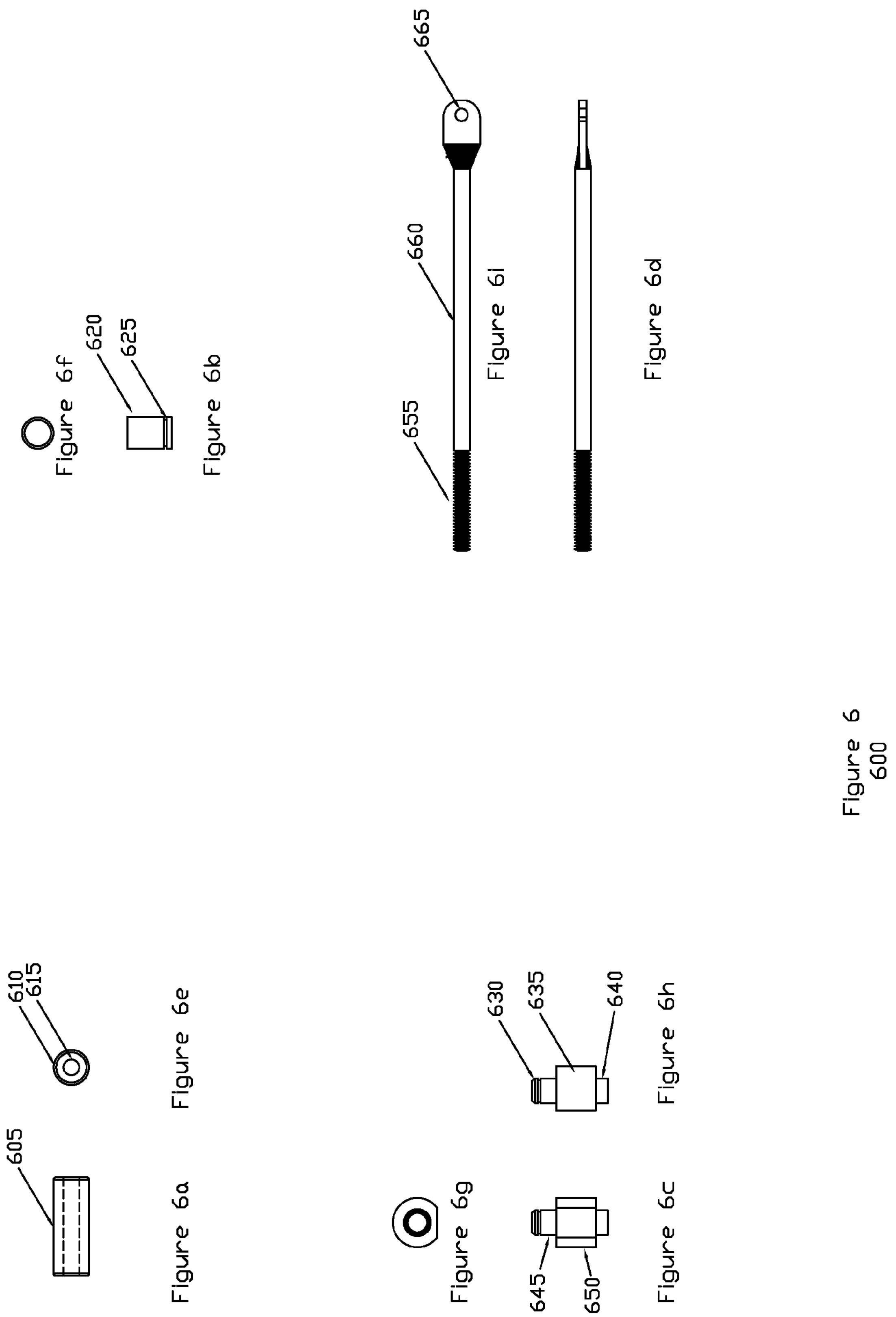
FIG. 6 illustrates various components including the following shown in subfigures.
FIG. 6*a* shows a side view of a brake pad rod guide whilst
FIG. 6*e* shows a top view thereof.
FIG. 6*b* shows a side view of a brake support lever mount whilst
FIG. 6*f* shows a top view thereof.
FIG. 6*c* shows a side view of a pad swivel arm mount whilst
FIG. 6*g* shows a top view and FIG. 6*h* shows a side view thereof.
FIG. 6*d* shows a side view of a brake pad rod and FIG. 6*i* shows a front view thereof.

FIG. 6 illustrates various components including a brake pad rod guide, a brake support lever mount, pad swivel arm mount, and brake pad rod. FIG. 6*a* shows a brake pad rod guide 605 showing that it is a cylindrical component made from metal, plastic or similar materials. The brake pad rod guide 605 has a central hollow shaft 615 of a smaller diameter than the outer diameter of the outer face of the same; the central hollow shaft 615 cuts through the central portion of the brake pad rod guide from one side to another side. FIG. 6*b* illustrates a brake support level mount 620 which is used to attach the brake assembly to the cabin (shown in FIG. 12.) The brake support level mount 620 has a depression 625 on one end running along its circumference for an insertion of a "C" clip; the mount 620 fits into a hole in a top vertical support member shown in FIG. 12 as item 1215 that is locked in place by the "C" clip. The other side of the mount is welded to the back of the brake back plate as shown in FIG. 5 525 for example or FIG. 2, 215. FIG. 6*c* illustrates a brake pad swivel arm mount in two views: a front view showing a front flat face and a rotated view where the front flat face is not shown and a top view showing this feature. The brake support lever mount 650 has a top 645 and bottom portion 640 that are smaller in width or diameter than the middle portion 635; the top portion 645 has a depression running along the circumference of the top portion for insertion of a 'C' clip that forbids upwards disengagement of an attached swivel arm because the 'C' clip is sufficiently large that its extremities do not allow the swivel arm (not shown) to disengage the piece. FIG. 6*d* illustrates a brake pad rod having a long rod 660 made of a metal such as steel having an externally threaded end 655 followed by a portion without threads ending on the other end with a flat portion (or head piece) having a hole perforating the flat portion. This flat portion extends outwards equidistantly from the central rod on either side so that a trapezoidal structure is formed and this is followed integrally with a linear region; finally, the structure ends with a semi-circular region of material perforated by a central hole 665 in this semi-circular region.

Figures 7, 7A, 7B, 7C, 7D, 7E, 7F, 7G, 7H, 7I, 7J:
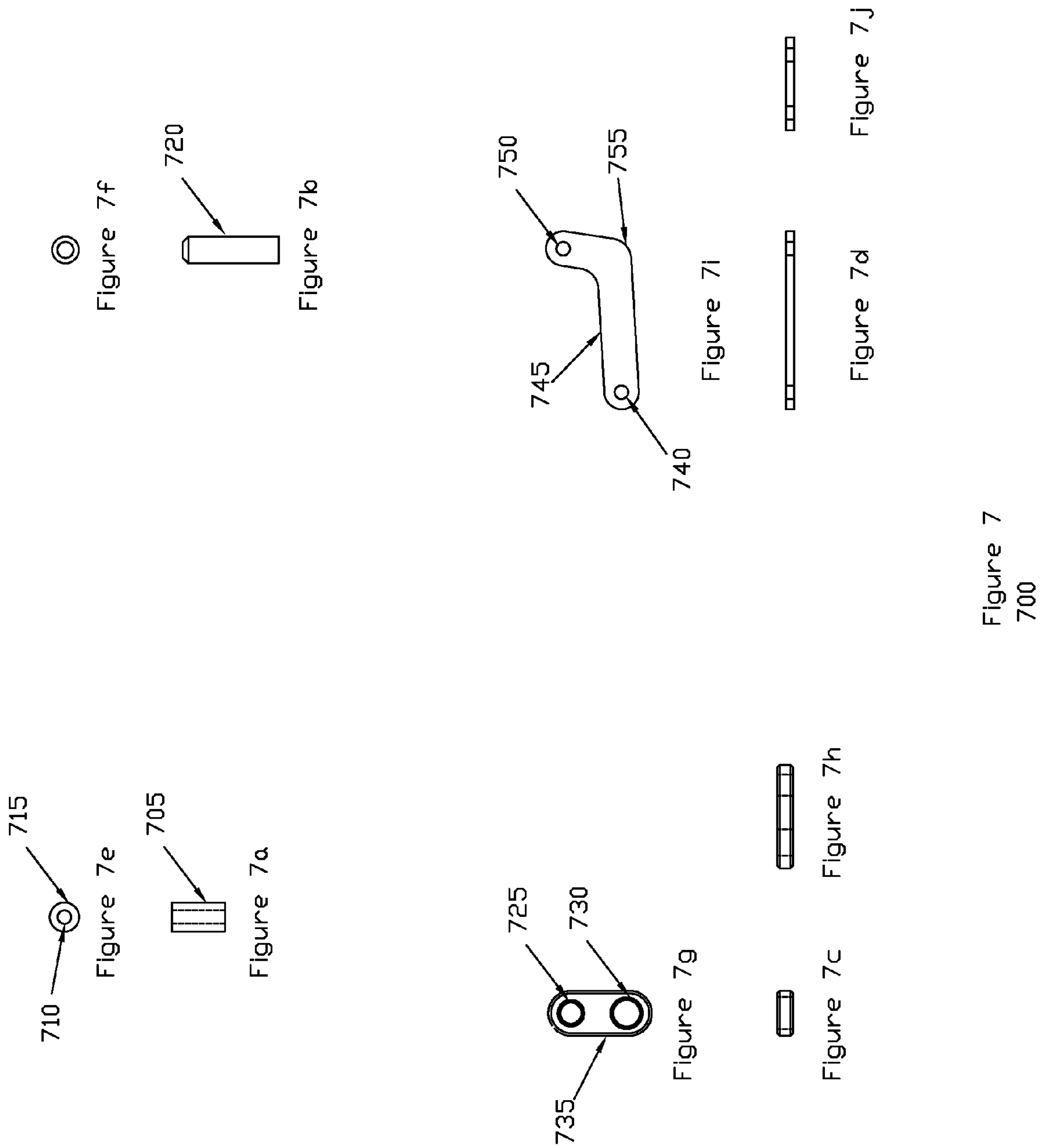
FIG. 7 illustrates views.
FIG. 7*a* shows a front view of a wheel spacer whilst
FIG. 7*e* shows a top view thereof.
FIG. 7*b* shows a front view of a level bumper whilst
FIG. 7*f* shows a top view thereof.
FIG. 7*c* shows a front view of a swivel arm whilst
FIG. 7*g* shows a top view and FIG. 7*h* shows a side view thereof.
FIG. 7*d* shows a front view of an 'L'shaped brake lever whilst
FIG. 7*i* shows a top view and FIG. 7*j* shows a side view thereof.

FIG. 7 illustrates views having a wheel spacer, a level bumper, a swivel arm and an 'L' shaped brake lever. FIG. 7*a* illustrates a wheel spacer 705 showing that it is a cylindrical component made from metal, plastic or similar materials. The wheel spacer 705 has a central hollow shaft 710 of a smaller diameter than the outer diameter 715 of the outer face of the wheel spacer; the central hollow shaft 710 cuts through the longitudinal central portion of the wheel spacer from one side to another side. FIG. 7*b* illustrates a level bumper that is a circular solid piece of plastic, metal or similar material that has a small conically shaped top that has been cutoff at the top. FIG. 7*c* illustrates a swivel arm 735 that is an oblong part ending in two oppositely formed semicircles. These two semicircles have two circular perforations or holes 725, 730 formed on the top and bottom portions of the swivel arm 735; it should be apparent that the bottom circular hole 730 is larger than the top circular hole 725. FIG. 7*d* illustrates an 'L' shaped brake lever 745 having two circular perforations 740, 750 or holes located at the rounded ends of the 'L' shaped brake lever that transitions between the legs of the 'L' shape at an intersection 755 between the legs.

Figures 8, 8A, 8B, 8C, 8D, 8E, 8F, 8G, 8H, 8J, 8K, 8L:
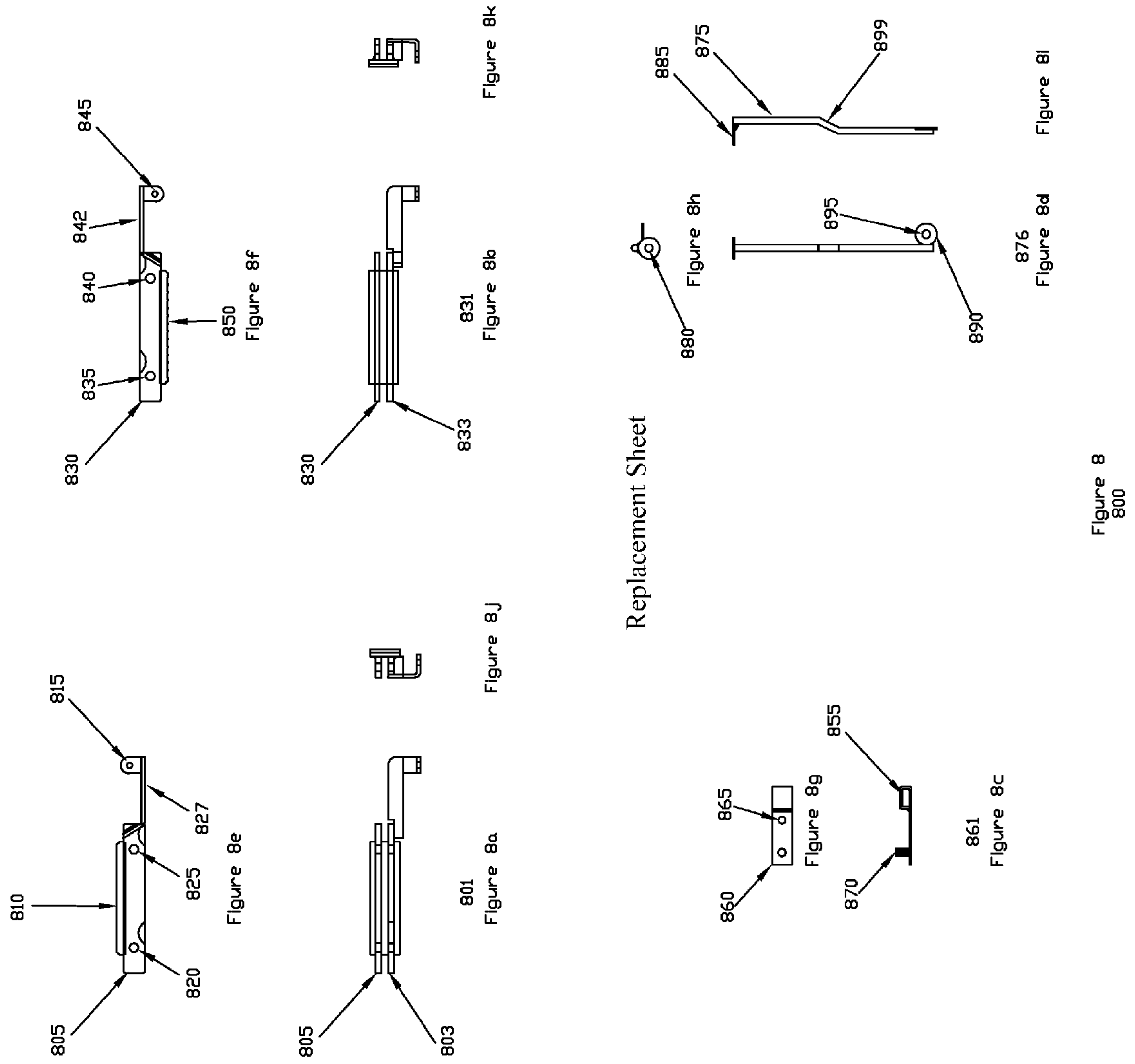
FIG. 8 illustrates several devices.
FIG. 8*a* shows a front view of a left brake pad device whilst
FIG. 8*e* shows a top view and FIG. 8*j* shows a side view thereof.
FIG. 8*b* illustrates a front view of a right brake pad device whilst
FIG. 8*f* shows a top view and FIG. 8*k* shows a side view thereof.
FIG. 8*c* shows a front view of a brake pivot lever whilst
FIG. 8*g* shows a top view thereof and FIG. 8*d* shows a brake seal rod whilst
FIG. 8*h* shows a top view thereof.

FIG. 8 illustrates brake pad holder devices, brake pivot lever and a brake seal rod. FIG. 8*a* illustrates a bottom view (top), a front view (bottom left) and a side view (bottom right) of a left brake pad holder device 801 made from steel or similar materials having a welded brake pad 810 that is welded to a bottom longitudinal member 803. The brake pad

810 is welded perpendicularly on top of longitudinal member's 805 edge and bottom longitudinal member's 803 edge running parallel to and shown underneath the top member 805 that both have holes 820, 825 therethrough spaced near either longitudinal end of the members. The pad lever 827 has a hole 815 in a flange thereof; this pad lever 827 is welded to the bottom of member 803 at one end of the same. Thus, in the front view it can be appreciated that this device extends parallel to the direction of the longitudinal members then extends down on a downwards integral portion ending in an inwards extending integral perpendicular flange at one end for connecting the brake pad device with an 'L' shaped brake lever. FIG. 8*b* illustrates a bottom view (top), a front view (bottom left) and a side view (bottom right) of a right brake pad holder device 831 made from steel or similar materials having a brake pad 850 that is welded to a bottom longitudinal member 833. The brake pad 850 is welded perpendicularly to longitudinal member 830 and bottom longitudinal member's 833 edge running parallel to and shown underneath the top member's 830 edge that both have holes 835, 840 therethrough spaced near either longitudinal end of the members. The brake pad lever 842 has a hole 845 in a flange thereof; this pad lever 842 is welded to the bottom of member 833 at one end of the same. Thus, in the front view it can be appreciated that this device extends parallel to the direction of the longitudinal members then down on a downwards integral portion ending in an inwards extending integral perpendicular flange at one end for connecting the brake pad device with an 'L' shaped brake lever. FIG. 8*c* illustrates a brake pivot rod lever 860 that is a long piece of iron, steel or similar material having a threaded post (or bolt attached at its top to the long piece of metal) 870 near one end and a rectangular enclosed space 855 at an opposite end having a cavity for the passage of the spring shaft. Between the two ends is a hole 865 that is used to mount this part to the brake back plate using a bolt, washer and a locking nut. FIG. 8*d* illustrates a brake seal rod having a crankshaft type of bend in the middle of the rod made from iron steel or similar materials. The rod starts as one straight oblong piece 875 having a circular flange 885 with a hole 880 arranged at its beginning that is perpendicular to the length of the rod. An angled bend 899 in the rod gives it the 'crankshaft type' shape though only a portion of the 'crankshaft' is apparent from the figure. The angles bend is followed by another portion of the rod that parallels the first portion of the rod 875 such that this another portion of the rod ends with another circular flange 890 having a central hole 895 therein. This flange 890 is perpendicular to the first one 880 and is also parallel to the length of the rod. Whilst both the top flange 885 and the bottom flange 890 extend outwards from the rod length, the central part of each flange is rotated ninety degrees from the other one.

Figures 9, 9A, 9B, 9C, 9D, 9E, 9F, 9G, 9H, 9J, 9K, 9L, 9M, 9N, 9O:
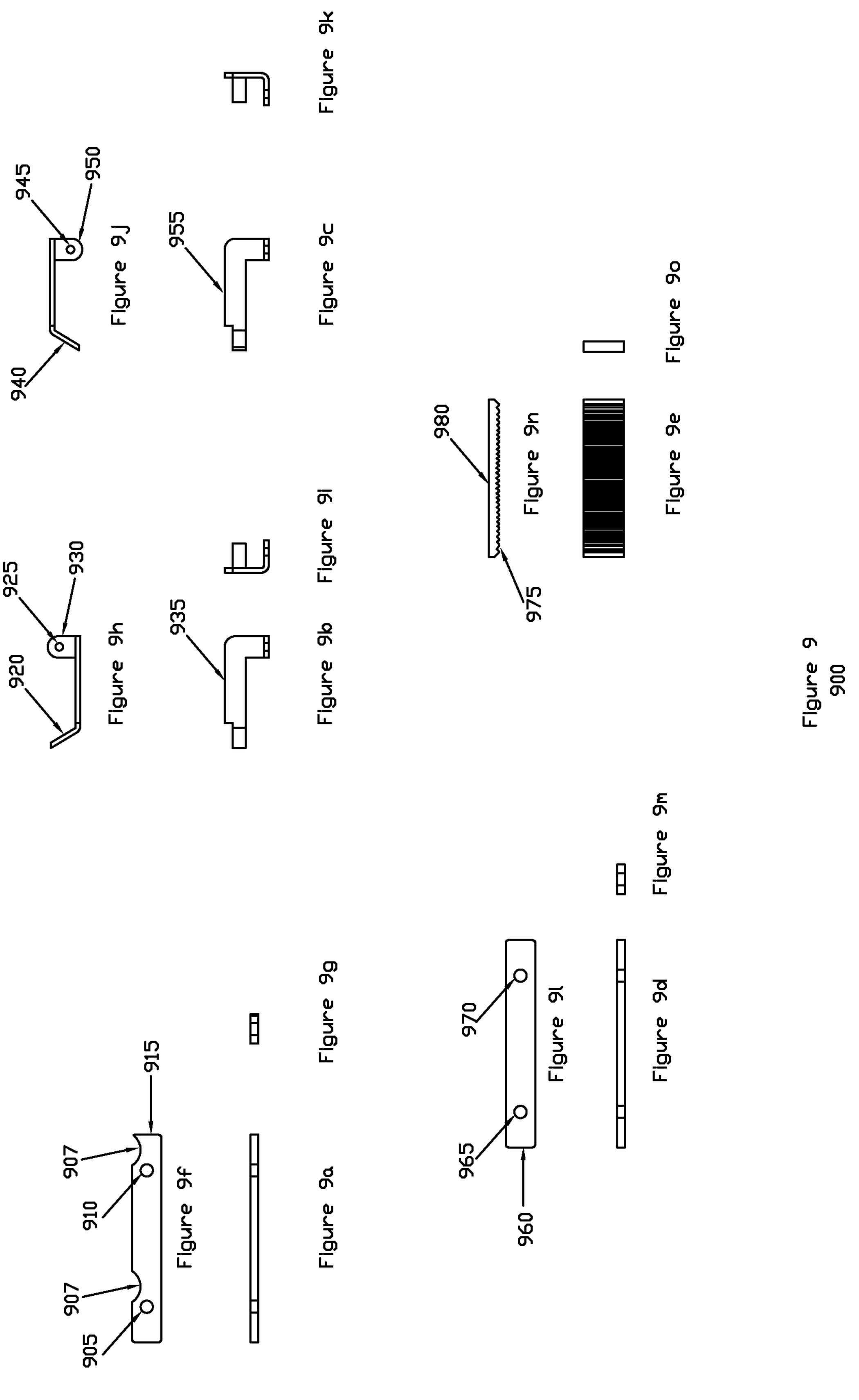

FIG. 9 illustrates various components of the brake pad device including a top longitudinal member, a left armature, a right armature, a bottom longitudinal member and a brake pad. FIG. 9*a* illustrates a bottom pad holder rectangular slab of material 915 such as steel having two holes 905, 910 and two curved cutouts 907 for providing space for the mounts mentioned previously. From right to left the holes 905, 910 are arranged before the first cutout 907 and before the second curved cutout 907. The holes 905,910 are utilized to attach the top and bottom swivel arms mentioned previously to the top 960 and bottom 915 longitudinal members. FIG. 9*b* illustrates a left brake pad holder armature or lever device 935 that are attached to brake holder longitudinal members 803 in FIG. 8. The lever device is a generally 'L' shaped piece of material having a top cutout that serves as a placement zone for the longitudinal member 803 welding on top of a connection point 920 that is an inwardly directed angled portion of the armature at one end of the same. The other end of the armature has an inwardly directed flange 930 having a hole 925 for attachment to the aforementioned lever; here inwardly means the centerline of the brakes. FIG. 9*c* illustrates a right brake pad holder armature or lever device 955 that are attached to brake holder longitudinal members 833 in FIG. 8. The lever device is a generally 'L' shaped piece of material having a top cutout that serves as a placement zone for the longitudinal member 833 welding on top of a connection point 930 that is an inwardly directed angled portion of the armature at one end of the same. The other end of the armature has an inwardly directed flange 950 having a hole 955 for attachment to the aforementioned lever; here inwardly means the centerline of the brakes. FIG. 9*d* illustrates a top pad holder 960 that is a rectangular slab of material such as steel having two holes 965, 970 space close to either end of the slab and that match in location two holes 905, 910 in the bottom pad holder 915. The holes 965,970 are utilized to attach the top and bottom swivel arms mentioned previously to the top 960 and bottom 915 longitudinal members. FIG. 9*e* illustrates a pad 980 made from steel or similar materials utilized to brake the cabin in an elevator having teeth or a brail-like surface 975.

Figure 10:
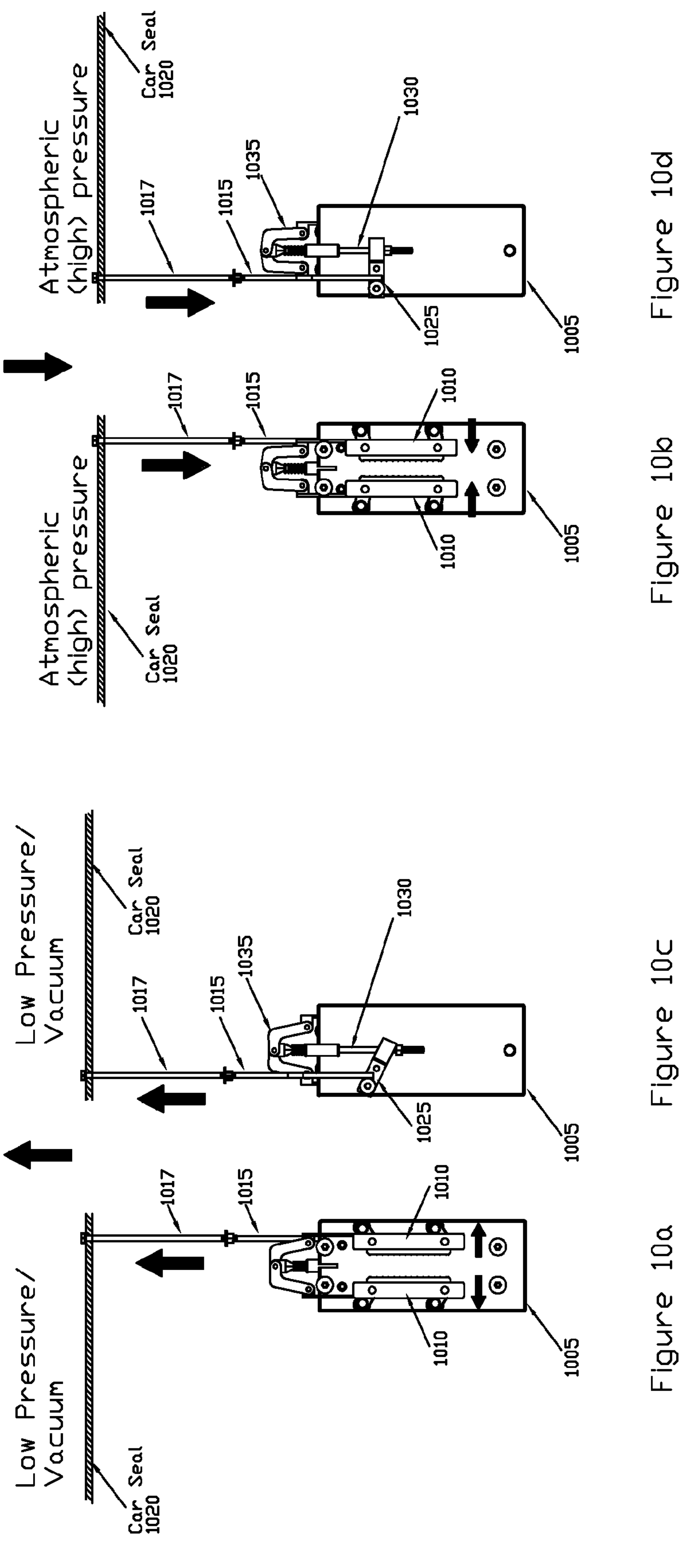
FIG. 10 illustrates how low pressure or high pressure on the cabin seal causes the opening and closing of the brake pad devices; in particular.

FIG. 10 illustrates the opening and closing of the brake pads. FIG.10*a* illustrates a front and back portion of the braking system on the left and right respectively. In particular, there is shown the opening of the brake pads away from a vertical center line down between the two brake pad holders 1010; thus, to open the pads the arrows in the drawing indicate an outwards direction away from each other. The top of the vehicle or cabin has a seal 1020 that is exposed to the pressure present in the cylinder within which the cabin moves. When a low pressure or vacuum condition is created in this cylinder the top of the cabin seal 1020 moves slight upwards as indicated by the up arrows. This seal is attached to the brake pad device by a threaded bolt or rod 1017 being attached to brake seal rod 1015. The first rod 1017 passes through a hole in the car seal 1020 and its integral head rests on the top of the seal 1020. It then is attached to the top of brake seal rod 1015 using the threads of 1017 and a screwed on nut so that the bolt or rod 1017 is threaded through the top of the flange 880, 885 found in FIG. 8*d* that is perpendicular to the longitudinal portion of the brake seal rod 1015 and locked by a screwed on nut. The brake seal rod 1015 has another flange 890, 895 at the bottom parallel to the longitudinal portion of the brake seal rod 1015 that is utilized to attach to the lever 135 using a nut 125 at a welded screw 165 as shown in FIG. 1; as the brake seal rod 1015 moves upwards as a result of vacuum pressure the brake rod lever is pulled upwards along with it. The lever swivels on a central pin that is attached to the brake back plate 1005 causing the other side of the brake pivot lever 1025 to move downwards that in turn presses against a nut that is attached to a brake pad rod 1030; clearly, this motion pulls the spring shaft downwards causing it to store compression energy. This causes the 'L'shaped levers to move downwards at the central connection point that further acts on the rest of the components to move the brake pad holders 1010 outwards as shown more clearly in FIG. 11*a*, 13*a*. FIG. 10*b* shows the opposite motion in that the brake pad holders 1010 are moved inwards to grab the railing (not shown) as shown by the direction of the arrows in the drawing. FIG. 10*b* illustrates a front and back portion of the braking system on the left and right respectively. The top of the cabin seal 1020 reacts to an atmospheric high pressure situation by compressing downwards slightly; this causes the rod attached to the top of the cabin seal to also compress downwards moving the brake seal rod 1015 to move down also. This motion causes the brake pivot lever 1025 to rotate on its centrally attached bolt swivel moving the left side of the brake pivot lever 1025 down and the right side upwards. Consequently, the 'L'shaped levers that are attached at one end to the hole in the brake pad rod 1030 are pushed upwards that moves the spring to its uncompressed extension. The motion is translated to the rest of the brake mechanism and the brakes move inwards grasping the railing (not shown) there between and stopping the motion of the cabin. This motion is further described in FIG. 11*b*, 13*b*.

Figures 11, 11A, 11B, 11C, 11D:
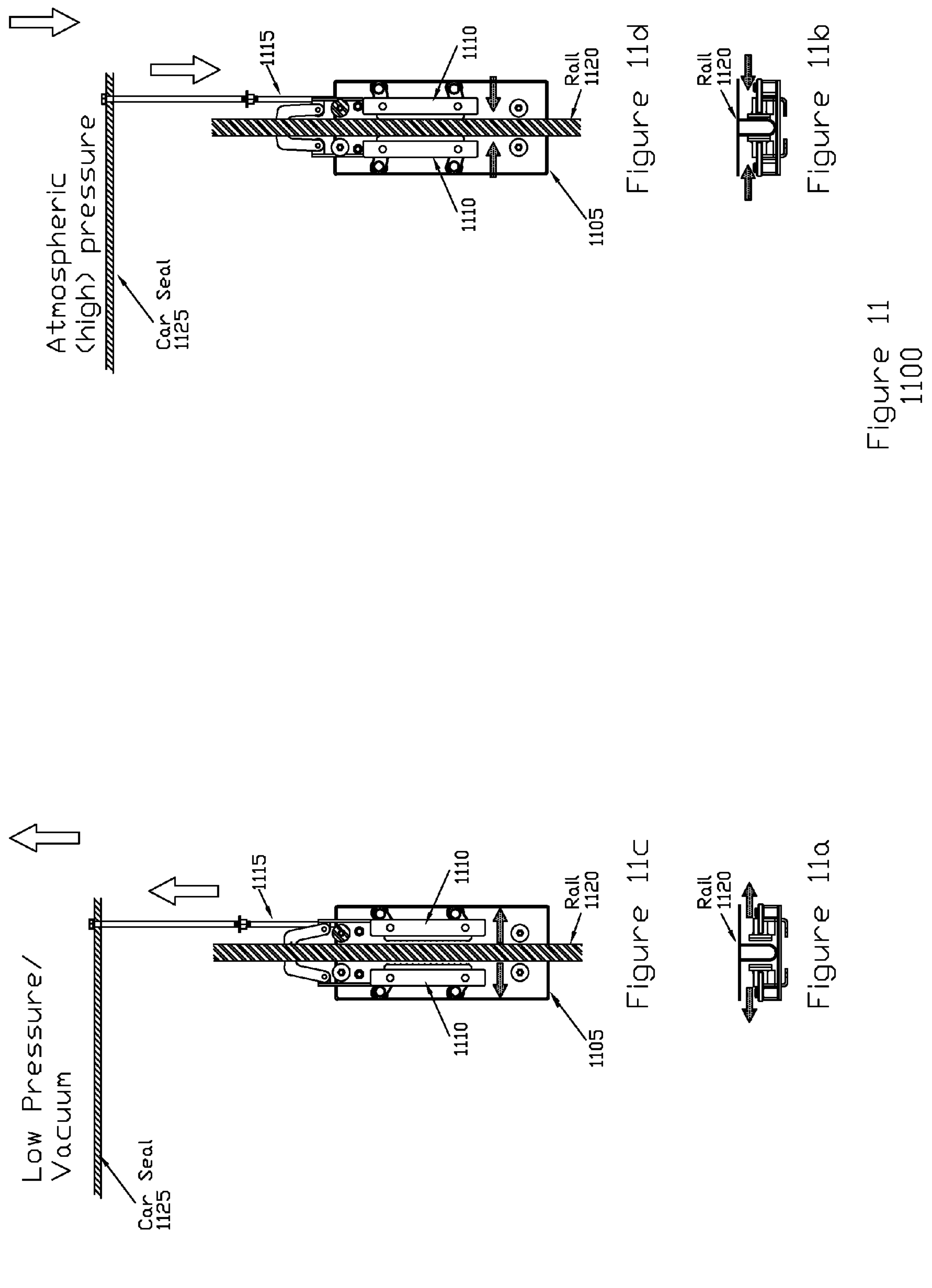
FIG. 11 illustrates how the railing is situated between the two brake pads to open and close the brake pad devices; in particular.
FIG. 11*a* shows a top view indicating the effect of low pressure whilst
FIG. 11*c* shows a front view thereof.
FIG. 11*b* shows a top view of the effect of high pressure on the brake device whilst
FIG. 11*d* shows a front view thereof.

FIG. 11*a* illustrates a front view of the braking system showing a railing between the two brake pad devices 1110. The brakes move outwards as indicated by the horizontal arrows as low pressure on the cabin seal 1125 moves the brake seal rod 1115 upwards translating an outwards motion through the mechanisms of the device. FIG. 11*b* illustrates a front view of the braking system showing a railing between the two brake pad devices 1110. The brakes move inwards as indicated by the horizontal arrows as high pressure on the cabin seal 1125 moves the brake seal rod 1115 downwards translating an inwards motion through the mechanisms of the device.

FIG. 12 illustrates the location of two brakes on either side of the cabin. A top metal plate 1250 seals the cabin with a rubber seal about its perimeter that is not shown in the drawing. It is attached to the top of a horizontal steel frame structure through a bolt 1240 and nut 1245 locking system threaded through holes on the cabin seal 1250 and the horizontal top steel frame. A pair of welded vertical steel members are attached on either side of the steel frame and are used to mount the entire brake device upon a transverse small piece of steel that is located between each pair of vertical members. A bottom horizontal steel member forms the floor of the cabin that is attached to both pairs of vertical steel members 1210. A small welded vertical steel member 1215 is attached to the back of the brake back plate 1205 using a brake support lever mount that is expressed in the drawings as a small welded bolt or pin and to the transverse small piece of steel with a similar brake support lever mount.

FIG. 13 illustrates in more detail the motion of the braking system 1300 that causes the opening and closing of the brake. FIG. 13*a* illustrates the opening of the brake through motion of the various components of the same. The brake back plate 1305 has all of the attached components as previously described. More particularly, brake pad mounts 1310 are attached to swivel arms 1320 through a hole 1315 in the swivel arm 1320 that is aligned with holes in the brake pad mounts 1310. A hex nut is threaded onto a hex bolt passing through the holes in both brake pad mounts 1310 and through swivel arm 1320 to lock them together; however, the diameter of the bolt is of such size that it permits the swiveling action inwards and outwards at this connection point. The other side of swivel arm 1320 has a hole therein that for passage of the top of a swivel arm mount. A "C" clip locks the top of the swivel arm mount as it passes through this hole exposing its top for insertion of the "C" clip. The swivel arm can therefore swivel about this other point permitting both brake pads to be moved outwards in the drawing. The lower swivel arm as well as the ones on the other brake pad mount functions similarly and a description of its function is omitted to avoid repetition. The compression spring 1335 works against a brake rod guide (and the triangular part of the brake rod) located concentrically on the long part of the spring shaft that is attached at its circular end through a hole to one side of 'L' shaped levers 1330. These 'L' shaped levers are connected to brake pad mounts through a bolt and nut connection. As the brake rod is pulled downwards, the compression spring 1335 stores energy and the central connection of the 'L' shaped levers with the brake rod are pulled downwards with it creating a downwards impression or bowing on the top part of the two 'L' shaped levers. In order for the brakes to be separated, therefore, a force must be applied at the swivel arm mounts and this happens by the 'L' shaped arms 1330 being forced down at their central connection point bending the arms 1330 so that their lower legs are forced outwards causing the brake pad mounts 1320 to swivel about their connection points 1315 and 1325. FIG. 13*b* illustrates closing of the brake through motion of the various components of the same. In this instance, the bowing of the 'L' shaped levers is upwards because the brake rod is pushed upwards translating into the an upwards motion of the central connection point between the two 'L' shaped levers 1330. As the 'L' levers move at one end upwards this causes the other connection point to the brake pad mounts to move inwards as they swivel on arms 1320 so as to grab the railing (not shown).

As previously mentioned, the brakes have a normal closed position. This position is held by the force generated by the compression spring onto the brake pad rod which is attached to the 'L' levers that is also attached to the brake pads. When the elevator starts there is a vacuum differential pressure on top of the cabin seal, that initially allows it to gently move away from the cabin at the start of elevation. The brake system uses this initial separation between cabin and seal in order to pull the brake seal rod and release the brake. When the rod is pulled, the brake pivot levers pivot, generating a force onto the brake pad rod and overcoming the force of the spring therefore compressing it. This vertical movement is transmitted to the brake pad level. Because the brake pads are held to the brakes positioner (swivel arm mounts) the vertical movement becomes circular in motion causing a pivoting action on the brakes positioner (swivel arm mounts). This change of direction provokes that the brake pads to separate, allowing the brakes to open. In this action the wheels to start working allowing the brakes to move along the guide or rail of the main cylinder. In the event that the elevator suddenly looses vacuum, the cabin seal will return to its original position. This removes the force being acted on the compression spring causing the brakes to close and stopping the downward motion of the car, finally this action stops an uncontrolled descent of the cabin.

All components are made from steel or similar man made materials unless otherwise indicated; any choice of materials or sizes that is appropriate to the embodiments taught herein is contemplated. All components are welded unless otherwise stated such as being moveably connected etcetera. The instant invention has been shown and described herein in what is considered to be the most practical and preferred embodiment. It is recognized, however, that departures may be made therefrom within the scope of the invention and that numerous modifications may be made that would be within the bounds defined by the following claims.

We claim:

1. A safety brake for an enclosed pneumatic elevator cabin having a first seal, the safety brake comprising:

a rod device connected to the first seal of the cabin and further connected to a braking device connected to the cabin a brake pad rod connected to the rod device and to the braking device a cylindrical compression spring loaded onto the brake pad rod until it meets a head piece of the brake pad rod that is larger than the diameter of the compression spring a brake pad rod guide attached to the braking device and the brake pad rod guide having a cavity therein such that a narrow portion of the brake pad rod is inserted in the compression spring and then into the brake pad rod guide a brake pivot lever attached to the brake pad rod, to the rod device and to the braking device and a pair of brake levers attached to the head piece of the brake pad rod.

2. The safety brake of claim 1, wherein each of the pair of brake levers is attached at an end thereof to the head piece.

3. The safety brake of claim 2, further comprising:

a pair of brake holders moveably mounted on the braking device and attached to the brake levers such that each brake holder is attached to just one of the brake levers.

4. The safety brake of claim 3, further comprising:

a pair of brake pads each attached to just one of the brake holders.

5. The safety brake of claim 3, wherein the pair of brake holders moveably mounted on the braking device are attached to swivel mounts moveably attached to the braking device.

6. A pneumatic vacuum elevator braking system comprising:

a braking device connected to a structural element of a pneumatic vacuum elevator wherein the braking device is further connected to a seal of the pneumatic vacuum elevator through an intermediate device wherein the intermediate device further comprises a spring actuated assembly comprising:

a pair of brake holders moveably attached to the braking device each having a brake pad and each brake holder attached to one of a pair of levers wherein the pair of levers are connected to each other at a point and at that same point with a shaft having a first threaded end and a headpiece at another end such that a spring is loaded on the shaft such that a shaft holder having the shaft inserted therein with the spring between the shaft holder and the head piece of the shaft where the shaft holder is connected to the braking device wherein the shaft is connected at the first threaded end to a lever that is itself connected to a rod device that is connected to the seal.

* * * * *